(12) United States Patent
Wang et al.

(10) Patent No.: US 10,750,200 B2
(45) Date of Patent: Aug. 18, 2020

(54) ENCODING METHOD, DECODING METHOD, ENCODER, AND DECODER

(71) Applicant: PEKING UNIVERSITY SHENZHEN GRADUATE SCHOOL, Shenzhen (CN)

(72) Inventors: Ronggang Wang, Shenzhen (CN); Kui Fan, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/474,879

(22) PCT Filed: Jul. 24, 2017

(86) PCT No.: PCT/CN2017/094032
§ 371 (c)(1),
(2) Date: Jun. 28, 2019

(87) PCT Pub. No.: WO2018/120797
PCT Pub. Date: Jul. 5, 2018

(65) Prior Publication Data
US 2019/0373281 A1    Dec. 5, 2019

(30) Foreign Application Priority Data

Dec. 29, 2016 (CN) .......................... 2016 1 1243035

(51) Int. Cl.
*H04N 19/159* (2014.01)
*H04N 19/52* (2014.01)
*H04N 19/176* (2014.01)

(52) U.S. Cl.
CPC ........... *H04N 19/52* (2014.11); *H04N 19/159* (2014.11); *H04N 19/176* (2014.11)

(58) Field of Classification Search
CPC .... H04N 19/52; H04N 19/159; H04N 19/176; H04N 19/105; H04N 19/107;
(Continued)

(56) References Cited

U.S. PATENT DOCUMENTS

| | | | |
|---|---|---|---|
| 9,350,988 B1 | 5/2016 | Bankoski et al. | |
| 2010/0166069 A1* | 7/2010 | Goel ................... | H04N 19/176 375/240.13 |

(Continued)

FOREIGN PATENT DOCUMENTS

| | | |
|---|---|---|
| CN | 101193305 A | 6/2008 |
| CN | 101272494 A | 9/2008 |

(Continued)

*Primary Examiner* — Howard D Brown, Jr.
(74) *Attorney, Agent, or Firm* — Miles & Stockbridge P.C.

(57) ABSTRACT

Disclosed is an intraframe prediction method, wherein for an intraframe predicted block in an interframe predicted frame, when an interframe predicted blocks exists on the lower right of the intraframe predicted block, a coding and decoding sequence of intraframe and interframe blocks is adjusted, and intraframe prediction is performed in a lower right intraframe prediction approach, i.e., performing prediction using the lower right reconstructed pixel value as the reference pixel point for the intraframe predicted block; at the coding procedure, each coded unit is first coded, and upon completion of the coding, information of all interframe predicted blocks is written into a code stream; next, two-pass coding is performed to the intraframe predicted block; lower right intraframe coding is performed during the two-pass coding process; after completion of the two-pass coding, the information of the intraframe predicted block is written into the code stream; at the decoding procedure, decoding of all (Continued)

interframe predicted blocks is first completed; then, lower right intraframe decoding is performed to the intraframe predicted blocks. The present disclosure may improve the intraframe prediction accuracy and enhance the coding efficiency of the intraframe predicted block in the interframe predicted frame.

6 Claims, 3 Drawing Sheets

(58) Field of Classification Search
CPC .... H04N 19/11; H04N 19/184; H04N 19/503; H04N 19/577; H04N 19/58; H04N 19/593
See application file for complete search history.

(56) References Cited

U.S. PATENT DOCUMENTS

| | | | |
|---|---|---|---|
| 2010/0208803 A1* | 8/2010 | Matsuo | H04N 19/147 |
| | | | 375/240.12 |
| 2018/0255301 A1* | 9/2018 | Zhao | H04N 19/176 |
| 2019/0387234 A1* | 12/2019 | Wang | H04N 19/593 |
| 2020/0021831 A1* | 1/2020 | Zhao | G06F 9/30058 |

FOREIGN PATENT DOCUMENTS

| | | |
|---|---|---|
| CN | 102907100 A | 1/2013 |
| CN | 103686166 A | 3/2014 |
| WO | 2016137368 A1 | 9/2016 |

\* cited by examiner (a)　　　　　　　　　(b)

ENCODING METHOD, DECODING METHOD, ENCODER, AND DECODER

CROSS-REFERENCE TO RELATED APPLICATIONS

The present application is a national stage filing under 35 U.S.C. § 371 of PCT/CN2017/094032, filed on Jul. 24, 2017 which claims priority to CN Application No. 201611243035.3 filed on Dec. 29, 2016. The applications are incorporated herein by reference in their entirety.

FIELD

Embodiments of the present disclosure relate to the field of video coding, and more particularly relate to a novel intraframe prediction method for intraframe coding, which may be applied to intraframe predicted blocks in an interframe predicted frame (including P-frame (one-way predicted frame) and B-frame (two-way predicted frame)), so as to enhance the efficiency of encoding the intraframe predicted blocks.

BACKGROUND

As people become increasingly demanding on video resolution, information transmission bandwidth and storage capacity occupied by video and image contents also become larger. How to further increase the compression ratio of a video becomes a serious challenge. Although many technologies have been proposed for improving interframe prediction, few have been proposed for improving intraframe prediction. Without interframe image references, compression efficiency cannot be effectively improved.

According to conventional intraframe prediction technologies, the current predicted block is generally obtained by extrapolation to the reconstructed pixel points on the left of and above the current block, where the pixel points on the right and beneath cannot be used as reference pixel points. Because the processing sequence of coded units in the encoder/decoder is raster scan or Z-scan, the coded unit on the right of beneath the current block cannot be reconstructed before completion of coding the current block; as such the pixel points on the right of and below the current block cannot be referenced. This greatly reduces the information that may be referenced by the intraframe prediction and hampers accuracy of intraframe prediction.

SUMMARY

To overcome the above drawbacks in the prior art, the present disclosure provides a novel intraframe prediction method for intraframe coding. As an intraframe prediction approach using a lower right reference pixel point (hereinafter, this approach is shortly referred to as "lower right intraframe prediction approach"), the present disclosure may be applied for intraframe predicted blocks in an interframe predicted frame (including P-frame (one-way predicted frame) and B-frame (two-way predicted frame)) to thereby enhance efficiency of coding the intraframe predicted block.

Principle of the present disclosure: when performing intraframe prediction, as the processing sequence of coded units in the encoder and decoder is raster scan or Z-scan such that reconstruction of the coded units on the right of, beneath, on the lower right (collectively referred to as the lower right, covering those on the right, beneath, or on the lower right) of the current block cannot be completed before completion of coding the current block, the pixel point beneath or on the right of the current block cannot be referenced. If the pixel values on the right of and beneath the current intraframe coded block may be reconstructed in advance, more reference information would be available to the current intraframe predicted block, thereby providing more options for intraframe coding. As intraframe prediction has a very strong dependency on the reference pixel points on the left and above while interframe prediction does not rely on other blocks in the spatial domain (which only copies corresponding blocks from reference frames as interframe predicted blocks), the coding sequence in the encoder/decoder may be correspondingly adjusted such that if it is an interframe predicted back that is on the right or beneath the current intraframe predicted block, the reference pixel point on the lower right may be obtained. Intraframe prediction precision can be enhanced by designing a novel intraframe prediction method.

Therefore, for an intraframe predicted block in P frame or B frame, the present disclosure performs intraframe prediction using the reconstructed pixel values on the lower right: first, to be capable of providing more reference pixel points to the intraframe predicted block in the P frame or B frame, the coding sequence of intraframe and interframe blocks needs to be adjusted; at the coding end, the intraframe predicted block is subjected to two-pass coding. At the decoding end, all interframe predicted blocks are first decoded before decoding the intraframe predicted block. During the decoding or two-pass coding process, if what is beneath or on the right of the intraframe predicted block is an interframe predicted block, intraframe prediction may be performed with the reconstructed value on the lower right as the reference pixel point for intraframe prediction. The predicted block obtained using the lower right reference pixel point is weighted with the conventional intraframe coded predicted block to obtain the final predicted block. By designing a prediction direction-based adaptive linear weighting approach, advantages of the conventional intraframe prediction method and the present intraframe prediction method may be leveraged to the utmost extent. At the coding end, it is needed to determine, through coding decision, whether to use the lower right reference pixel point to perform intraframe prediction. Therefore, for each eligible intraframe predicted block, a 1-bit label needs to be transmitted into the code stream so as to label whether intraframe prediction has used the lower right reference pixel point. During the decoding process, if the condition of using the lower right reference pixel point is satisfied, the label in the code stream is read, and then the decoding end determines whether to use the lower right reference pixel point based on the meaning of the label; as such, intraframe prediction is realized.

A technical solution of the present disclosure is provided below:

An intraframe prediction method, which is applicable for predicting an intraframe predicted block in an interframe predicted frame (P frame or B frame) and thus referred to as lower/right intraframe prediction method herein, specifically comprises: for an intraframe predicted block in the P frame or B frame, performing intraframe prediction using a reconstructed pixel value on the right or beneath, which includes: first, to be capable of providing more reference pixel points for the intraframe predicted block in the P frame or B frame, adjusting the coding and decoding sequence of intraframe and interframe blocks, wherein at the coding end, each coded unit is first encoded according to a conventional coding scheme to decide whether it is an intraframe predicted block or an interframe predicted block, and then the intraframe predicted block is subjected to two-pass coding so as to undergo two-pass intraframe prediction and coding using the reconstructed pixel points surrounding the intraframe predicted block (including the lower right block); and at the decoding end, all interframe predicted blocks are first decoded before the intraframe predicted blocks. The present intraframe prediction method breaks away from the raster scanning approach in the original decoder and thus may promote intraframe prediction accuracy and enhance coding efficiency of the intraframe predicted block in P frame or B frame.

During the decoding or two-pass coding process, if what is beneath or on the right of the intraframe predicted block is an interframe predicted block, intraframe prediction may be performed with the reconstructed value of the right/lower block as the reference pixel point for intraframe prediction. Different from conventional intraframe prediction, the present disclosure adopts the reconstructed pixel points on the right of, beneath (or on the lower right of) the intraframe predicted block as the reference pixel point.

At the coding end, it needs to determine, based on a coding decision, whether to use the lower right reference pixel value to perform intraframe prediction; therefore, for each eligible intraframe predicted block, a 1-bit label needs to be transmitted into the code stream so as to label whether the intraframe prediction has used the lower right reference pixel value.

During the decoding process, if the condition of using the lower right reference pixel point is satisfied, the label in the code stream is read, and the decoding end determines whether to use the lower right reference pixel point based on the meaning of the label.

When performing intraframe prediction using the lower right reference pixel point, two schemes may be adopted: one scheme is to directly performing direction prediction using the lower right reference pixel point so as to obtain the predicted block, wherein the prediction method is identical to the conventional intraframe prediction method except that the prediction direction is reverse to the conventional intraframe prediction method; and the other scheme is to weight the intraframe predicted block using the lower right reference pixel point with the conventional intraframe predicted block to obtain the final predicted block.

If the intraframe prediction uses the final weighted predicted block, the present disclosure provides a prediction direction-based adaptive linear weighting scheme. If the intraframe prediction direction is a longitudinal direction, the longitudinal distance between the predicted pixel point and the reference pixel point is used as the weighted coefficient for linear weighting; if the intraframe prediction direction is a transverse direction, the transverse distance between the predicted pixel point and the reference pixel point is used as the weighted coefficient for linear weighting.

Compared with the prior art, the present disclosure has the following beneficial effects:

For an intraframe predicted block in a P frame or a B frame, intraframe prediction is performed using a lower right reconstructed pixel value, specifically comprising: introducing right side, lower side, and lower right side reconstructed values as reference pixel points for intraframe prediction, thereby providing more reference information for intraframe prediction; to obtain the lower right reconstructed pixel points, the sequence of coded units in the encoder/decoder is changed, wherein a two-pass coding scheme is adopted for the intraframe predicted block at the coding end; while at the decoding end, all interframe predicted blocks are first decoded before the intraframe predicted blocks; the encoder decides, based on a coding decision, whether to use the lower right reconstructed values as the reference pixel points for intraframe prediction, and a 1-bit label is transmitted to the code stream, such that the decoder performs corresponding intraframe prediction based on the label; when performing intraframe prediction using the lower right reconstructed pixel values, a direction adaptive linear weighting coefficient is designed, i.e., a weighted coefficient is decided by the intraframe prediction direction: if the intraframe prediction direction is a longitudinal direction, the longitudinal distance between the predicted pixel point and the reference pixel point is used as the weighted coefficient for linear weighting; if the intraframe prediction direction is a transverse direction, the transverse distance between the predicted pixel point and the reference pixel point is used as the weighted coefficient for linear weighting.

The present disclosure has the following advantages:

(1) The present disclosure proposes performing intraframe prediction using the lower right reconstructed pixel points during the P-frame or B-frame intraframe prediction process, which provides more reference information for the intraframe predicted block, thereby enhancing intraframe prediction accuracy.

(2) According to the prediction direction-based adaptive linear weighting scheme, the final predicted block is obtained by weighting the conventional intraframe coded predicted block with the predicted block obtained using the lower right reference pixel points; as such, the conventional intraframe predicted block may be well combined with the predicted block obtained using the lower right reference pixel point, which may introduce as less block boundaries as possible in the predicted block.

(3) By deciding whether to use the lower right reference pixel point for intraframe prediction and coding a 1-bit label into the code stream at the coding end, advantages of the conventional intraframe prediction method and the present intraframe prediction method may be utilized to the utmost extent.

DRAWINGS

Figure 2:
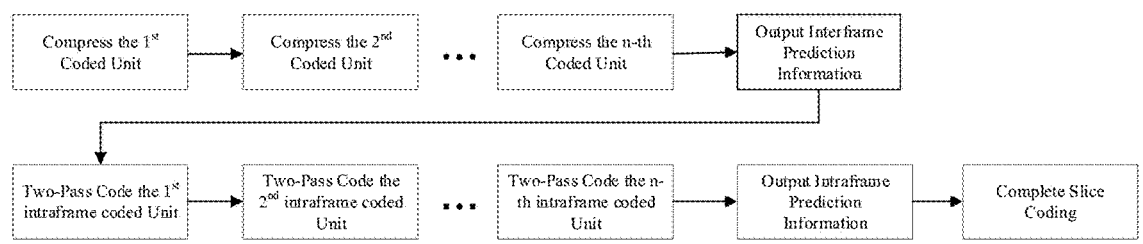
FIG. 2 is a block flow diagram at a coding end after a coding sequence is improved.

wherein the first line in FIG. 2 is a flow of performing conventional coding to all coded units; and the second line represents a process of performing two-pass coding to an intraframe coded unit.

Figure 3:
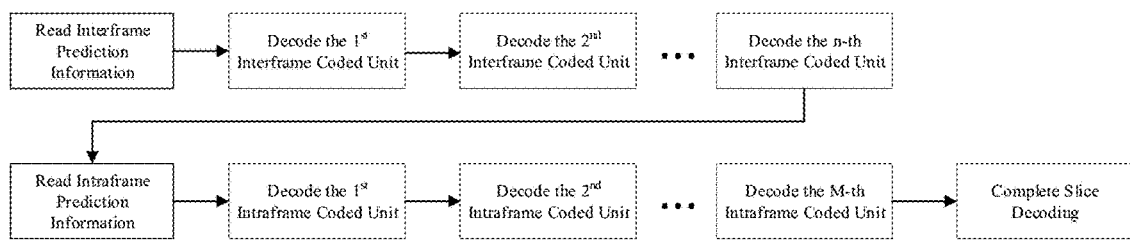

FIG. 3 is a block flow diagram at a decoding end after a decoding sequence is improved;

wherein the first line in the diagram represents a decoding flow of an interframe coded unit; and the second line represents a decoding flow of an intraframe coded unit.

Figure 4:
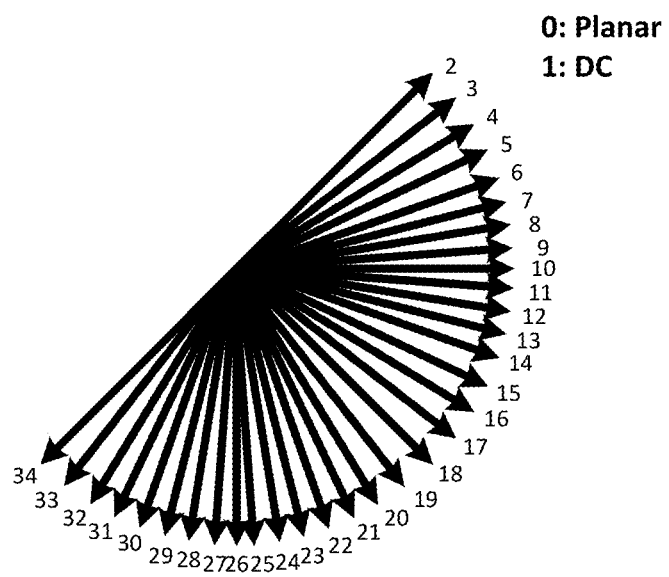

FIG. 4 is a schematic diagram of an intraframe prediction direction in an HEVC in an embodiment of the present disclosure;

wherein 2~17 represent a transverse prediction direction; and 18~34 represent a longitudinal prediction direction.

Figure 5:
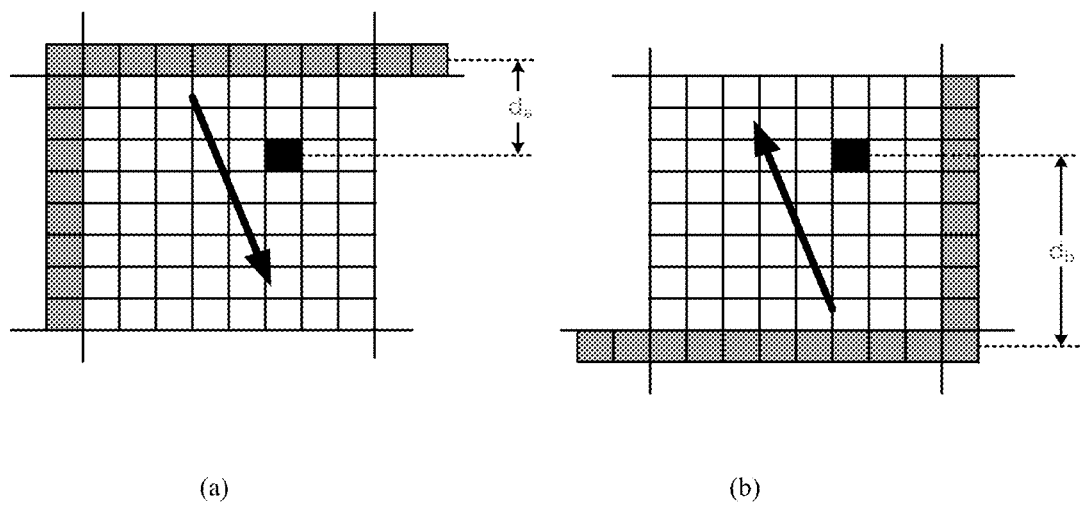

FIG. 5 is a schematic diagram of combining a conventional intraframe prediction method and a present lower right prediction method;

where (a) shows conventional intraframe prediction; (b) shows lower right intraframe prediction according to the present disclosure, where $d_a$ represents the longitudinal distance between a prediction pixel point and a reference pixel point in the conventional intraframe prediction method; and $d_b$ represents the longitudinal distance between the predicted pixel point and the reference pixel point in the present lower right intraframe prediction approach.

Figure 6:
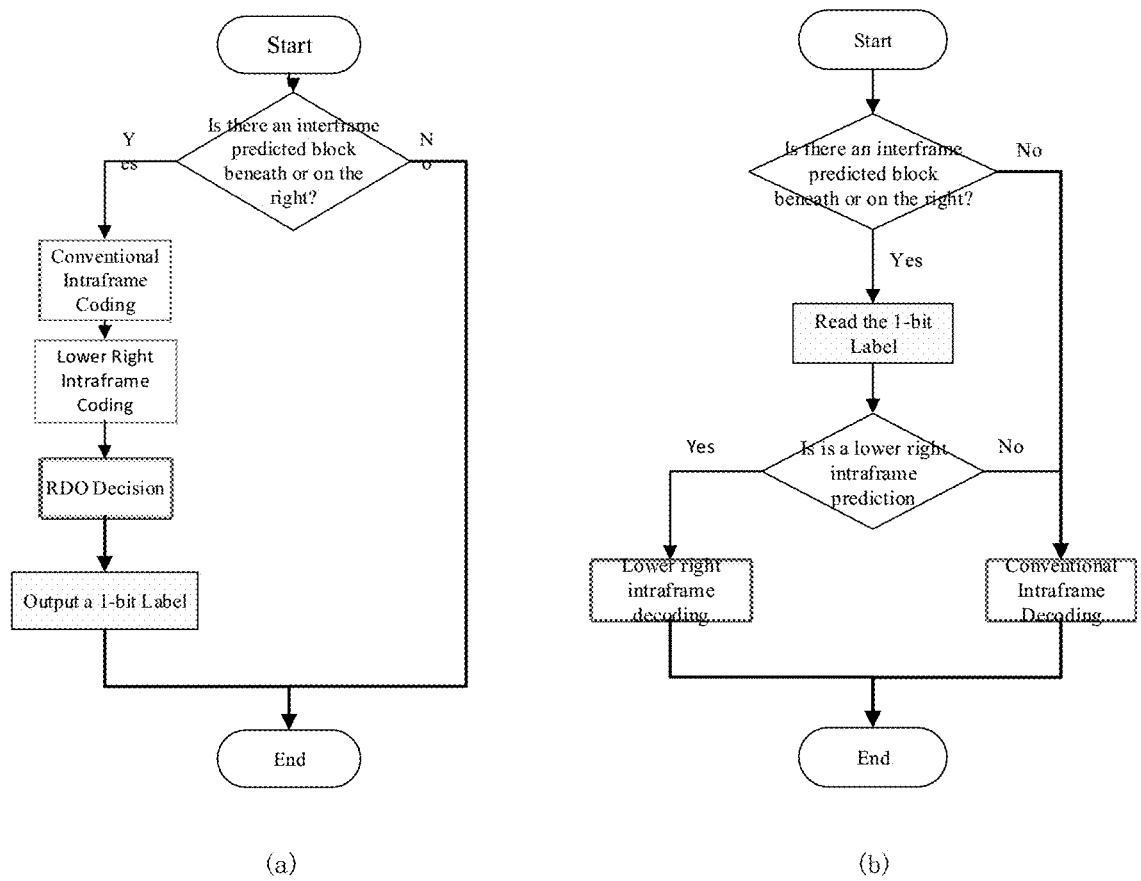

FIG. 6 shows respective block flow diagrams of performing two-pass coding decision and decoding an intraframe coded block in an embodiment of the present disclosure; where (a) represents a flow of performing two-pass coding decision to an intraframe coded block; and (b) represents a flow of decoding an intraframe coded block.

DETAILED DESCRIPTION OF THE PREFERRED EMBODIMENTS

Hereinafter, the present disclosure is further described through the embodiments, but the scope of the present disclosure is not limited in any manner.

The present disclosure provides a method for predicting an intraframe predicted block in an interframe predicted frame (P frame or B frame); by adjusting the coding sequence of intraframe and interframe blocks at the coding end and the decoding end, more reference pixel points are provided for the intraframe predicted block in the P frame or B frame; and then coding and decoding are performed, wherein the intraframe predicting method at the decoding end is identical to that at the coding end, i.e., adopting the lower right intraframe predicting method, thereby increasing the intraframe prediction accuracy and enhancing coding efficiency of the intraframe predicted block in the P frame or B frame.

Figure 1:
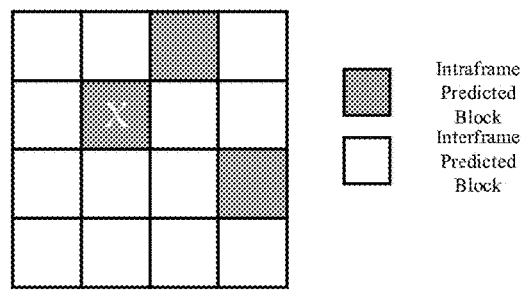
FIG. 1 is a schematic diagram of distributions of intraframe and interframe predicted blocks.

In the embodiment below, the schematic diagram of distribution of intraframe predicted blocks and interframe predicted blocks is shown in FIG. 1. For an intraframe predicted block X, the conventional intraframe prediction method uses the reconstructed pixel values on the left, above, and on the upper left, so as to obtain the predicted value of the block X. However, due to being limited by the coding sequence of coded units, reconstruction of the blocks on the right, beneath, and on the lower right is performed after completion of coding the block X, such that they cannot be used as reference values for block X intraframe prediction. However, if interframe predicted blocks exist on the right of, beneath, and on the lower right of the intraframe predicted block X in FIG. 1, by adjusting the sequence of the coded units in the encoder/decoder, the reconstructed value on the lower right may be obtained before performing intraframe prediction to the block X; then the intraframe prediction of the block X may reference the reconstructed pixel points on the right, beneath, or on the lower right.

The conventional prediction method refers to a prediction method used in an existing encoder, i.e., a method using the upper left reconstructed pixel as the intraframe prediction reference pixel. According to the method of predicting an intraframe predicted block provided by the present disclosure, when an interframe predicted block exists on the right of, beneath, or on the lower right of the intraframe predicted block, at the coding procedure, by adjusting the sequence of the coded units of the encoder, the reconstructed value of the lower right portion is obtained before performing intraframe prediction to the intraframe predicted block, and then prediction is performed with the right, beneath or lower right reconstructed pixel point as the intraframe prediction reference pixel point for the intraframe predicted block; at the decoding procedure, all of the interframe prediction blocks are first completely decoded before the intraframe predicted blocks are decoded; during the two-pass coding process of the coding procedure and the decoding process of the decoding procedure, when the block beneath or on the right of the intraframe predicted block is an interframe predicted block, the reconstructed pixel point on the right of, beneath, or on the lower right of the intraframe predicted block is used as the reference pixel point for intraframe prediction.

Specifically, as long as there is an interframe predicted block in the right, lower or lower right coded unit, the/lower right reconstructed value may be used as the reference pixel point. Specific steps as provided below:

at the coding procedure, for each intraframe predicted block, when there is an interframe predicted block in the right, lower or lower right intraframe predicted block, adjusting a sequence of coded units in an encoder; first encoding each coded unit, and upon completion of the coding, writing information of all interframe predicted blocks into a code stream; next, performing two-pass coding to the intraframe predicted block; upon completion of the two-pass coding, writing information of the intraframe predicted block into the code stream;

The flow diagram at the coding end after the sequence of the coded units of the encoder is adjusted is shown in FIG. 2. At the coding end, first, each coded unit is encoded according to a conventional coding scheme, i.e., the flow represented by the first line of FIG. 2. First, it is decided whether each coded unit is an intraframe predicted block or an interframe predicted block; upon completion of the coding, information of all interframe predicted blocks is written into the code stream. Then, the intraframe predicted block is subjected to two-pass coding (as shown in the second line of FIG. 2); after two-pass coding of the intraframe predicted block is done, the information of the intraframe predicted block is written into the code stream.

During the two-pass coding process, if it is an interframe predicted block that beneath or on the right of the intraframe predicted block, intraframe prediction may be performed with the reconstructed value on the right or beneath as the intraframe prediction reference pixel point; whether to use the lower right reference pixel point for intraframe prediction needs to be determined based on an RDO (Rate-Distortion Optimization) coding decision.

The process of performing two-pass coding to the intraframe predicted block is shown in FIG. 6(a). If what is beneath or on the right of the intraframe predicted block is an interframe predicted block, the two-pass coding is performed. First, conventional intraframe coding is performed (i.e., with the upper left reconstructed value as the intraframe prediction reference pixel point); then, coding is performed to the lower right intraframe (i.e., with the lower right reconstructed value as the intraframe prediction reference pixel point). Next, the two intraframe coding methods are compared through the RDO decision, and a 1-bit label is outputted to the code stream to label whether the intraframe prediction uses the lower right reference pixel point;

At the decoding procedure, first, interframe prediction information is read from the code stream to complete decoding of all interframe predicted blocks; then, the intraframe prediction information is read; next, the intraframe predicted blocks are decoded; the decoding flow is shown in FIG. 3. During the process of decoding the intraframe predicted blocks, at the decoding procedure, the raster scan and Z-scan sequence in the original decoder is broken away. First, interframe prediction information is read from the code stream to complete decoding of all interframe predicted blocks, as shown in the first line of FIG. 3; then, the intraframe prediction information is read; next, the intraframe predicted block is decoded, as shown in the second line of FIG. 3.

The flow of decoding an intraframe predicted block is shown in FIG. 6(b). During the decoding process, if what is beneath or on the right of the intraframe prediction block is an interframe predicted block, a 1-bit label is read from the code stream, and then whether to use the lower right intraframe predicted block is determined based on the label. If the lower right intraframe prediction is used, intraframe prediction is performed using the right or lower right reconstructed value as the intraframe prediction reference pixel point so as to complete the decoding (i.e., lower right intraframe decoding); otherwise, prediction and decoding are performed using the conventional intraframe prediction method. If what is beneath or on the right of the intraframe predicted block is an intraframe predicted block, prediction and decoding are performed directly using the conventional intraframe prediction.

When performing intraframe prediction using the lower right reference pixel points, two approaches may be adopted to obtain the predicted block for intraframe prediction: one approach is to directly perform direction prediction to obtain the predicted block using the lower right reference pixel point, which is identical to the conventional intraframe prediction method, except that the prediction direction is reversed; and the other approach is to weight the predicted block obtained by performing intraframe prediction using the lower right reference pixel points and the predicted block obtained by conventional intraframe prediction, so as to obtain a final predicted block.

When performing intraframe prediction using the lower right reference pixel point, if the final predicted block is obtained by weighting, the present disclosure provides a prediction direction-based adaptive linear weighting scheme: if the intraframe prediction direction is a longitudinal direction, a longitudinal distance between the predicted pixel point and the reference pixel point is used as the weighted coefficient for linear weighting; if the intraframe prediction direction is a transverse direction, a transverse distance between the predicted pixel point and the reference pixel point is used as the weighted coefficient for linear weighting. To improve the intraframe prediction accuracy to a larger extent, an embodiment of the present disclosure adopts a prediction direction-based adaptive linear weighting scheme. Particularly, the longitudinal direction means that the intraframe prediction mainly uses the above or lower reconstructed value as the reference pixel point, while the transverse direction means that the intraframe prediction mainly uses the left or right reconstructed value as the reference pixel point. FIG. 4 shows a schematic diagram of an intraframe prediction direction in HEVC (High Efficiency Video Coding Standard) according to this embodiment, where 2~17 represent the transverse prediction direction, and 18~34 represent the longitudinal prediction direction.

FIG. 5 shows a schematic diagram of a conventional intraframe prediction method and the lower right intraframe prediction approach provided by the present disclosure, where the gray shadow block represents a reference pixel point; $d_a$ represents a longitudinal distance between a prediction pixel point and a reference pixel point in the conventional intraframe prediction method, and $d_b$ represents a longitudinal distance between a predicted pixel point and a reference pixel point in the present lower right intraframe prediction approach. The intraframe prediction method shown in FIG. 5 is the longitudinal direction; therefore, the longitudinal distance between the predicted pixel point and the reference pixel point is used as a weighting coefficient for linear weighting. The prediction direction adaptive linear weighting may be expressed in equation 1~equation 2:

$$P_{comb}(x,y)=(d_b \cdot P_a(x,y)+d_a \cdot P_b(x,y)+(1<<(\text{shift}-1))) \\ >>\text{shift} \quad \text{(equation 1)}$$

$$\text{shift}=\log_2(d_a+d_b) \quad \text{(equation 2)}$$

where $P_{comb}$ denotes the weighted intraframe predicted block; $P_a$ denotes a conventional intraframe predicted block; $P_b$ denotes a lower right intraframe predicted block; x and y denote coordinates of the predicted pixel point in the predicted block; and shift is a normalization parameter, which guarantees that the final weighted predicted value is within a prescribed scope.

It may be seen from the equations above that the weight of the predicted value is inversely proportional to the distance between the predicted pixel point and the reference pixel point, because the larger the distance between the predicted value and the reference pixel is, the weaker their correlation is, and the more inaccurate the intraframe prediction is. Therefore, the larger the distance between the predicted value and the reference pixel is, the smaller the weight of the predicted value should be. Accordingly, the prediction direction-based adaptive linear weighting scheme may well combine the traditional intraframe prediction and the lower right intraframe prediction of the present disclosure, thereby improving the accuracy of intraframe prediction.

In view of the above, the lower right intraframe prediction approach of the present disclosure differs from the traditional intraframe prediction method in that their prediction directions are inverse: in the conventional intraframe prediction, the reference pixel point comes from the one above or n the left of the current intraframe predicted block; while in the lower right intraframe prediction, the reference pixel value comes from the one on the right of or below the current block; i.e., the prediction direction of the lower right intraframe prediction approach is in central symmetry with the prediction direction of the traditional intraframe prediction method. By introducing the lower right reference pixel point, the present disclosure may provide more reference information to the intraframe prediction; by lower right intraframe prediction, more intraframe prediction options may be provided to thereby improve efficiency of the intraframe prediction.

It needs to be noted that the embodiments as disclosed are intended to facilitate further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims.

We claim:

1. An intraframe prediction method, comprising: for an intraframe predicted block in an interframe predicted frame, when an interframe predicted blocks exists on the lower right of the intraframe predicted block, adjusting coding and decoding sequence of the intraframe and interframe blocks using a lower right intraframe prediction approach, i.e., performing intraframe prediction with the lower right reconstructed pixel value as the intraframe prediction reference pixel point for the intraframe predicted block; the intraframe prediction method comprises steps of:

A. at the coding procedure, when an interframe predicted blocks exists on the lower right of the intraframe predicted block, for the intraframe predicted block, adjusting a coding sequence of coded units of the encoder, specifically comprising:

A1: first, coding each coded unit; upon completion of the coding, writing all intraframe predicted block information into a code stream, and then performing two-pass coding to the intraframe predicted block;

A2: during the two-pass coding process, when an interframe predicted block exists on the lower right of the intraframe predicted block, performing lower right intraframe coding, i.e., performing intraframe prediction using the lower right intraframe prediction approach; and A3: after completion of the two-pass coding, writing all intraframe predicted block information into the code stream;

B. at the decoding procedure, performing the following operations:

B1. first completing decoding of all interframe predicted blocks;

B2: then, decoding the intraframe predicted blocks; during the decoding process, when an interframe predicted block exists on the lower right of the intraframe predicted block, performing lower right intraframe decoding, i.e., performing intraframe prediction using the lower right intraframe prediction approach.

2. The intraframe prediction method according to claim 1, wherein in the two-pass coding process of step A2, conventional intraframe coding is first performed; then, lower right intraframe coding is performed; then the conventional intraframe coding and the lower right interframe coding are compared using a rate distortion optimization coding decision method, and a label is outputted to the code stream for labelling whether the intraframe prediction uses the lower right reference pixel point.

3. The intraframe prediction method according to claim 2, wherein the label is a 1-bit label.

4. The intraframe prediction method according to claim 1, wherein during the decoding procedure in step B2, when it is an interframe predicted block that is on the lower right of the intraframe predicted block, the lower right intraframe decoding is performed, specifically: reading the label from the code stream, and determining whether to use the lower right intraframe prediction based on the label; when the lower right intraframe prediction is used, performing prediction and decoding using the lower right intraframe prediction approach; otherwise, performing prediction and decoding using the conventional intraframe prediction method; wherein when an intraframe predicted block exists on the lower right of the intraframe predicted block, prediction and decoding is performed using the conventional intraframe prediction method.

5. The intraframe prediction method according to claim 1, wherein in the lower right intraframe prediction approach, any one of the two approaches is adopted to obtain the intraframe predicted block: directly performing direction prediction to obtain the intraframe predicted block using the lower right reference pixel point, wherein the prediction direction is inverse to that of the conventional intraframe prediction method; and weighting the predicted block obtained by performing intraframe prediction using the lower right intraframe prediction approach and the predicted block obtained by performing intraframe prediction using the conventional intraframe prediction method to thereby obtain the intraframe predicted block.

6. The intraframe prediction method according to claim 5, wherein the second approach of obtaining the intraframe predicted block specifically adopts a prediction direction-based adaptive linear weighting approach; the prediction direction-based adaptive linear weighting specifically comprises: if the intraframe prediction direction is a longitudinal direction, using a longitudinal distance between the predicted pixel point and the reference pixel point as the weighted coefficient for linear weighting; if the prediction direction is a transverse direction, using a transverse distance between the predicted pixel point and the reference pixel point is use as the weighted coefficient for linear weighting; the prediction direction-based adaptive linear weighting is represented by equation 1~equation 2:

$$P_{comb}(x,y)=(d_b \cdot P_a(x,y)+d_a \cdot P_b(x,y)+(1<<(shift-1)))>>shift \quad \text{(equation 1)}$$

$$shift=\log_2(d_a+d_b) \quad \text{(equation 2)}$$

where $P_{comb}$ denotes the weighted intraframe predicted block; $P_a$ denotes a conventional intraframe predicted block; $P_b$ denotes a lower right intraframe predicted block; x and y denote coordinates of the predicted pixel point in the predicted block; $d_a$ represents a longitudinal distance between a prediction pixel point and a reference pixel point in the conventional intraframe prediction, $d_b$ represents a longitudinal distance between a predicted pixel point and a reference pixel point in the lower right intraframe prediction; and shift is a normalization parameter for ensuring that the final weighted predicted value is within a prescribed scope.

* * * * *